United States Patent
Toal et al.

(10) Patent No.: US 10,922,095 B2
(45) Date of Patent: Feb. 16, 2021

(54) SOFTWARE APPLICATION PERFORMANCE REGRESSION ANALYSIS

(71) Applicant: salesforce.com, inc., San Francisco, CA (US)

(72) Inventors: Brian Toal, San Francisco, CA (US); Laksh Venka, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 16/384,699

(22) Filed: Apr. 15, 2019

(65) Prior Publication Data

US 2020/0326957 A1  Oct. 15, 2020

(51) Int. Cl.
*G06F 9/44* (2018.01)
*G06F 9/445* (2018.01)
*G06F 9/48* (2006.01)

(52) U.S. Cl.
CPC .......... *G06F 9/44521* (2013.01); *G06F 9/485* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,289,506 B1 | 9/2001 | Kwong | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| 6,336,213 B1 | 1/2002 | Beadle | |

(Continued)

OTHER PUBLICATIONS

"Google Plus Users", Google+Ripples; Oct. 31, 2011; 3 pages.

(Continued)

*Primary Examiner* — Craig C Dorais
(74) *Attorney, Agent, or Firm* — Schwabe Williamson & Wyatt

(57) ABSTRACT

Embodiments of the present disclosure relate to software application performance regression analysis. Other embodiments may be described and/or claimed.

19 Claims, 5 Drawing Sheets

(56) References Cited

U.S. PATENT DOCUMENTS

| | | |
|---|---|---|
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,103,760 B2 | 1/2012 | Reedy |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,442,727 B2 | 9/2016 | Chou |
| 1,017,596 A1 | 1/2019 | Radigan |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0073904 A1 | 4/2004 | Hill |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0228936 A1 | 10/2005 | Kuo |
| 2006/0143350 A1 | 6/2006 | Miloushev |
| 2007/0226717 A1 | 9/2007 | Shtilman |
| 2008/0177756 A1 | 7/2008 | Kosche et al. |
| 2008/0249972 A1 | 10/2008 | Dillon |
| 2009/0063415 A1 | 3/2009 | Chatfield |
| 2009/0100342 A1 | 4/2009 | Jakobson |
| 2009/0157359 A1 | 6/2009 | Chernoff |
| 2009/0177744 A1 | 7/2009 | Marlow et al. |
| 2010/0122260 A1 | 5/2010 | Kawachiya |
| 2011/0218958 A1 | 9/2011 | Warshavsky |
| 2011/0247051 A1 | 10/2011 | Bulumulla |
| 2011/0321019 A1 | 12/2011 | Gibbons |

(56) References Cited

U.S. PATENT DOCUMENTS

| | | |
|---|---|---|
| 2012/0042218 A1 | 2/2012 | Cinarkaya |
| 2012/0072656 A1 | 3/2012 | Archak |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0068343 A1 | 3/2014 | Nakajima |
| 2014/0359537 A1 | 12/2014 | Jackobson et al. |
| 2015/0074668 A1* | 3/2015 | Burka .............. G06F 9/48 718/102 |
| 2015/0234652 A1 | 8/2015 | Naveh |
| 2016/0004582 A1 | 1/2016 | Nagura |
| 2016/0080368 A1 | 3/2016 | Heurich |
| 2016/0330067 A1 | 11/2016 | Liu |
| 2016/0378583 A1 | 12/2016 | Nakano |
| 2017/0068603 A1* | 3/2017 | Tai .................. G06F 9/522 |
| 2017/0132026 A1* | 5/2017 | Zang ............... G06F 9/4401 |
| 2017/0371766 A1 | 12/2017 | Gadi |
| 2018/0027058 A1 | 1/2018 | Balle |
| 2018/0121103 A1 | 5/2018 | Kavanagh |
| 2018/0177756 A1 | 6/2018 | Christopher et al. |
| 2018/0300067 A1 | 10/2018 | Mittal |
| 2018/0324030 A1 | 11/2018 | Dang |

OTHER PUBLICATIONS

Breigand et al., Automated Adaptive Threshold Setting: Enabling Technology for Autonomy and Self-Management, IEEE, 2005, retrieved on-line on Jul. 1, 2020, pp. 1-12; Retreived from Internet: https://ieeexplore.ieee.org/stamp/stamp.jsp?tp=&arnumber=1498065 (2005).

Yang, Yan and Eric Williams, "Logistic Model-Based Forecast of Sales and Generation of Obsolete Computers in the US." Technological Forecasting and Social Change 76.8 (2009); pp. 1105-1114.

Guzman, Javier Garcia, et al. "Practical Experiences in Modelling Software Engineering Practices: The Project Patterns Approach"; Software Quality Journal 21.2 (2013); pp. 325-354.

Garcia, Javier, et al. "Design Guidelines for Software Processes Knowledge Repository Development" Information and Software Technology 53.8 (2011); pp. 834-850.

Mshelk et al. "CoMet: A Tool Using CUMM to Measure Unused Component Member" IEEE International Conference on Computer Systems and Applications (2006) Dubai, UAE, pp. 697-703.

Luo et al., "VertexRank: Importance Rank for Software Network Vertices" 2014 IEEE 38th Annual Computer Software and Applications Conference, Vasteras (2014); pp. 251-260.

Dubois et al., "Autonomic Provisioning and Application Mapping on Spot Cloud Resources (2015) International Conference on Cloud and Autonomic Computing", Boston MA, pp. 57-68.

Alzami, Z., "Application of Redundant Computation in Program Debugging" Journal of Systems and Software, 81.11 (2008); pp. 2024-2033.

Pistoria et al. "A survey of Static Analysis Methods for Identifying Security Vulnerabilities in Software Systems"; IBM Systems Journal; 46.2 (2007); pp. 265-288.

Cho et al., "Redundancy Identification/Removal and Test Generation for Sequential Circuits Using Implicit State Enumeration", IEEE Transactions on Computer-Aided Design of Integrated Circuits and Systems; 12.7 (1993); pp. 935-945.

Cito Jurgen, "Software Runtime Analytics for Development: Extending Developer's Mental Models by Runtime Dimensions" Dissertation, Zurich, Feb. 2018; p. 216.

* cited by examiner

SOFTWARE APPLICATION PERFORMANCE REGRESSION ANALYSIS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

Embodiments of the present disclosure relate to software application performance regression analysis. Other embodiments may be described and/or claimed.

BACKGROUND

In conventional systems, software performance problems (also known as regressions) must often be manually detected and addressed. As the size and complexity of a software application increases, the level of effort to detect, analyze, and fix issues often becomes unmanageable. Moreover, such efforts are difficult to scale and are often subject to human error and bias. Software issues can lead to site outages, increased costs to serve, and other problems. Embodiments of the present disclosure address these and other issues.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for software application performance regression analysis.

I. System Examples

Figure 1A:
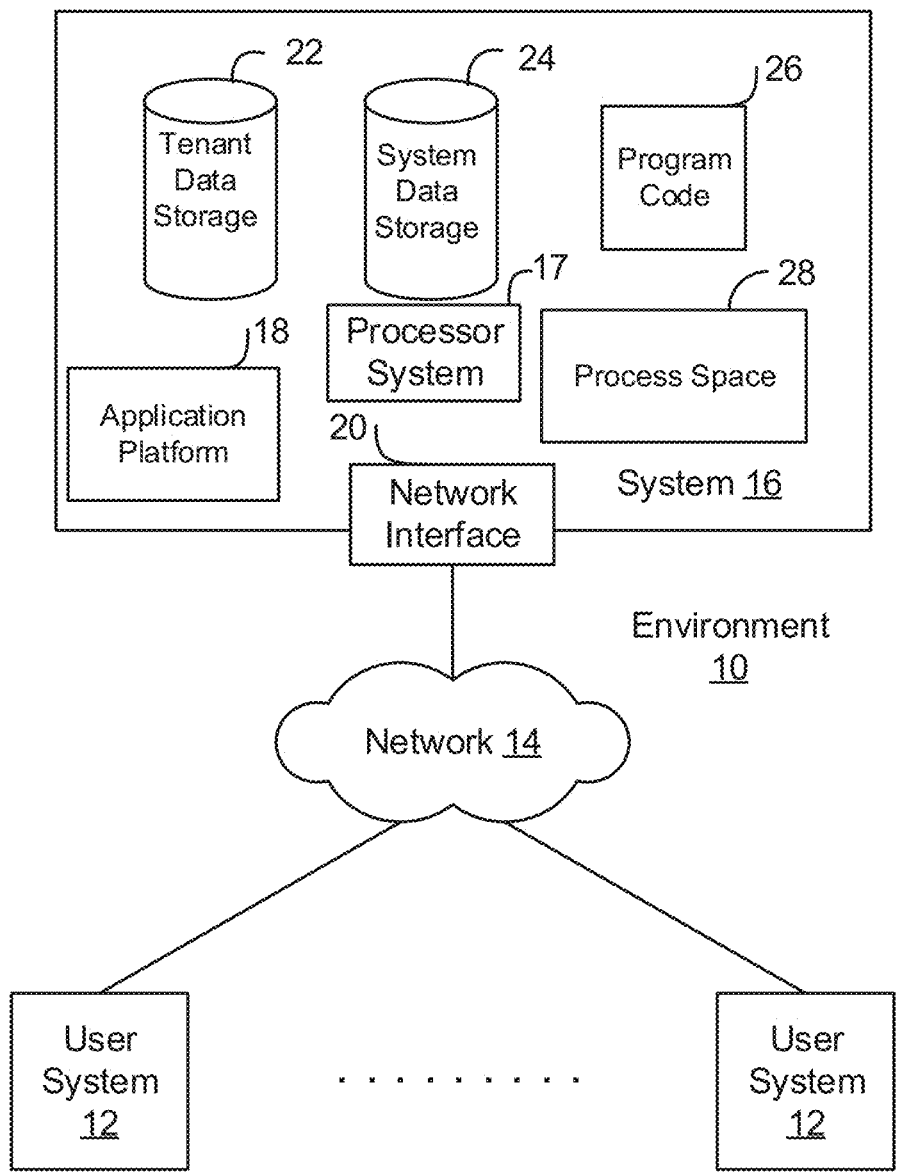
FIG. 1A is a block diagram illustrating an example of an environment in which an on-demand database service can be used according to various embodiments of the present disclosure.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED)

display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
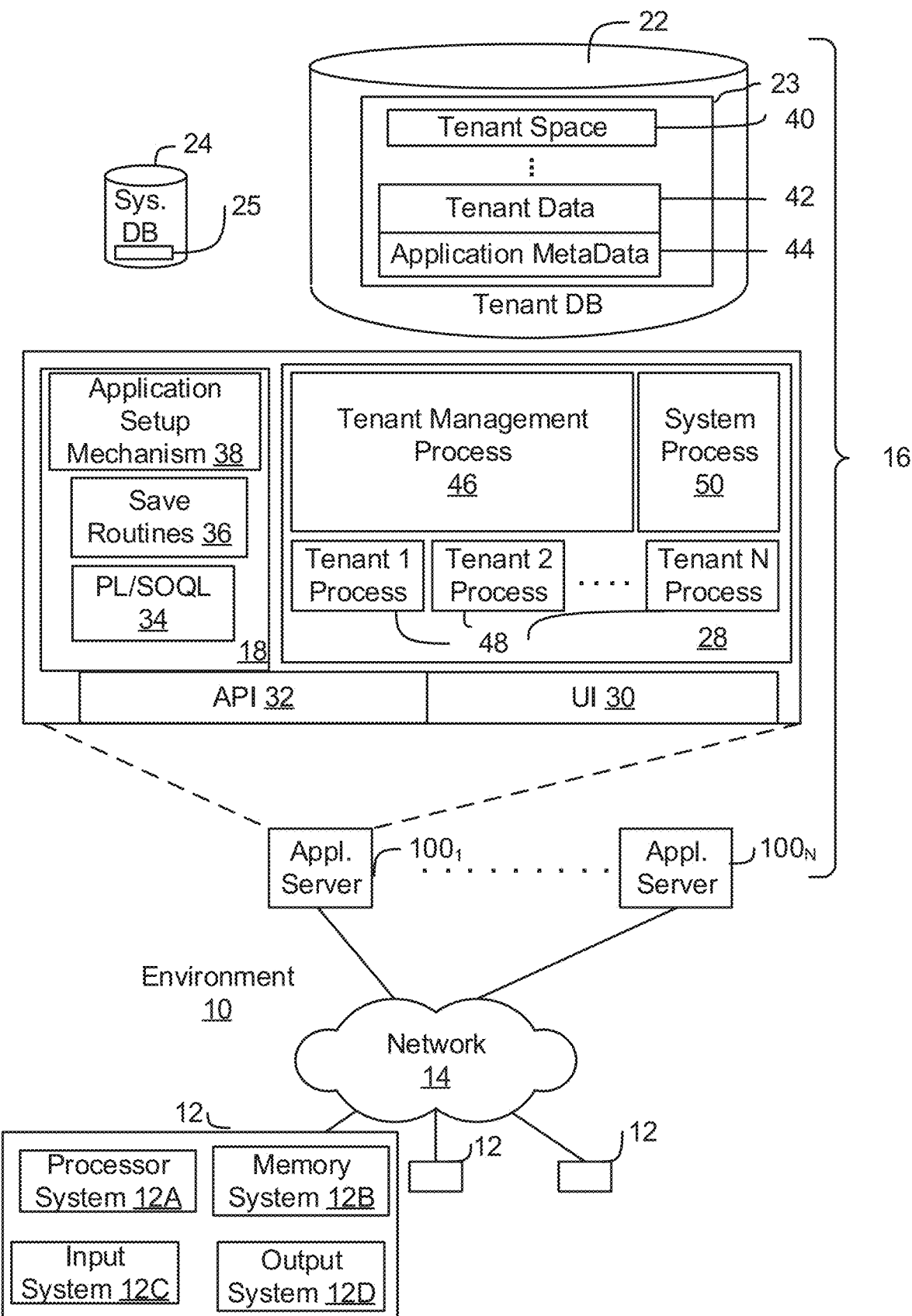
FIG. 1B is a block diagram illustrating examples of implementations of elements of FIG. 1A and examples of interconnections between these elements according to various embodiments of the present disclosure.

FIG. 1B shows a block diagram with examples of implementations of elements of FIG. 1A and examples of interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touch-screen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example of a storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of an MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Software Performance Regression Analysis

Embodiments of the present disclosure may use historical performance data to identify when the performance of a software application performance regresses. Furthermore, embodiments of the disclosure may identify which metrics have regressions, identify the code causing the regression, identify a developer or other entity responsible for the addressing the issue, and determining the priority of the issue.

Figure 2:
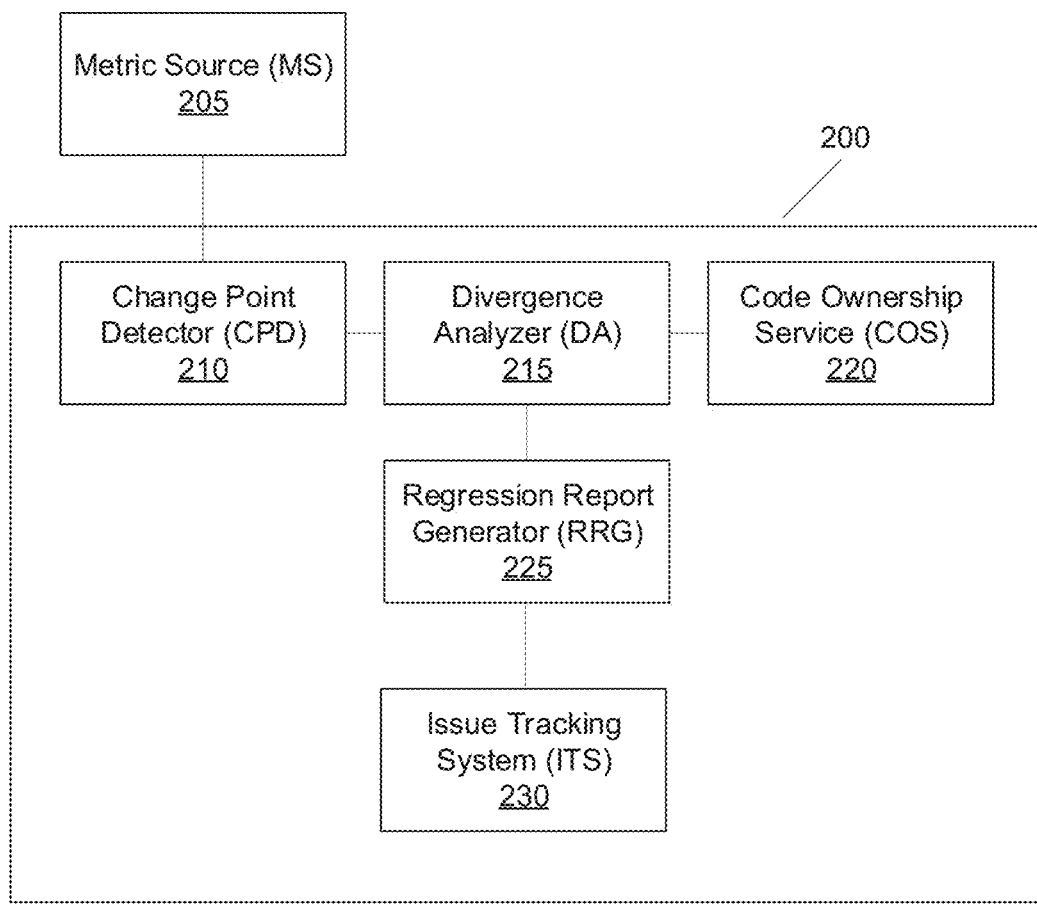
FIG. 2 is an example of a functional block diagram showing components of a system for performance regression analysis according to various aspects of the present disclosure.

FIG. 2 is a functional block diagram illustrating an example of components for performing software performance regression analysis according to various embodiments. In this example, regression analysis system 200 (which may also be referred to herein as an application performance management system) includes a change point detector 210 that retrieves metrics from a metric source 205. In some embodiments, the change point detector (CPD) identifies times when the probability distribution of a stochastic process or time series changes. Given a time series as input, the CPD provides as output whether a change has occurred or not. If a change has occurred, the CPD provides a timestamp corresponding to the change. The CPD may operate in conjunction with various change point detection algorithms.

System 200 further includes a divergence analyzer (DA). In some embodiments, given two mutually exclusive time periods, the DA acquires profiling data for each period and performs a differential comparison of the two sets. The DA returns the differences at different granularity (fine to coarse). Additionally the DA joins the data sets on a specified dimension (thread name, thread name & unique call path, etc.), and computes the difference of a specified metric (time spent in GC, CPU time, profile sample count, etc.). The DA may returns a top-k list of differences for each metric.

The code ownership service (COS) identifies the ownership of a file, class, or other source code element. In some embodiments, the COS provides a code ownership identification application program interface (API) that can be accessed by the DA.

The system 200 further includes a regression report generator (RRG). Given output from the CPD, DA, and COS, the RRG generates a report that provides information regarding the performance issue. The issue tracking system (ITS) is a service where regression issues are created and assigned to the identified code owner(s). In some embodiments, the RRG may transmit a report to the ITS to create or update an issue.

Figure 3:
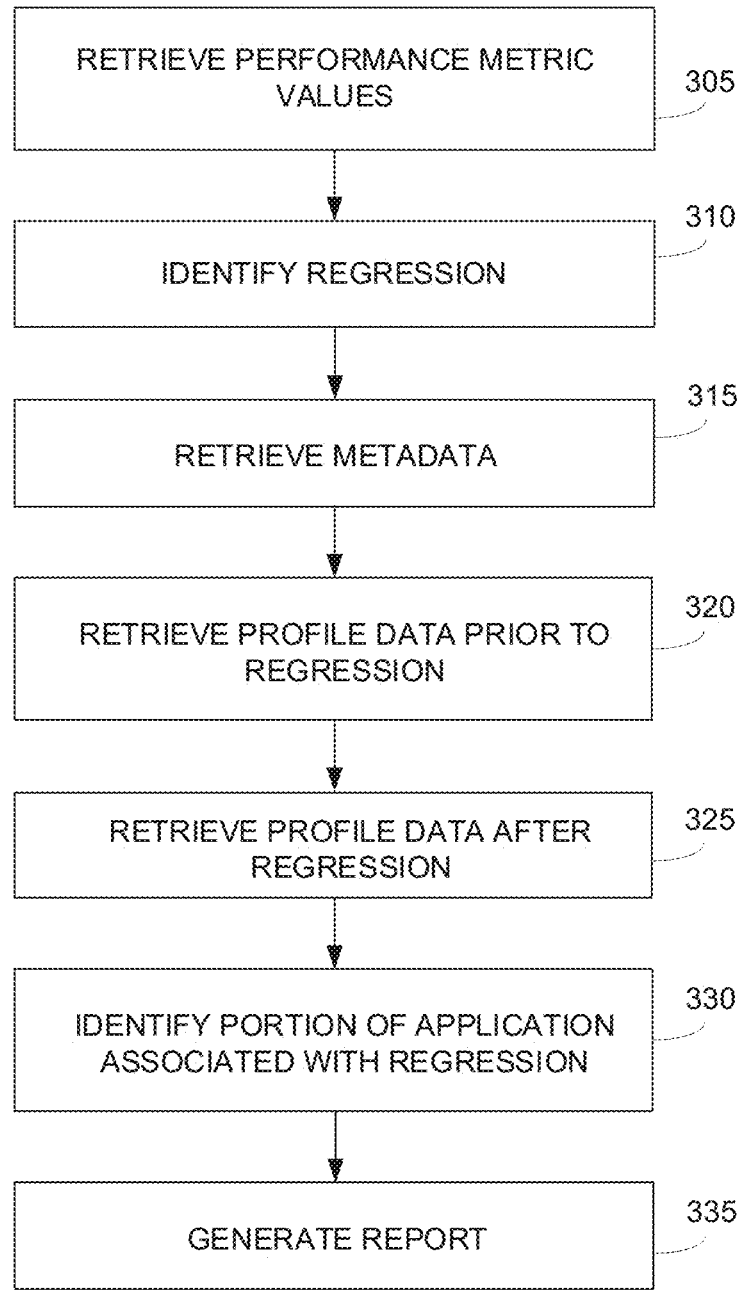
FIG. 3 is a flow diagram illustrating an example of a process according to various aspects of the present disclosure.

FIG. 3 is a flow diagram illustrating an example of a process 300 according to various aspects of the present disclosure. Any combination and/or subset of the elements of the methods depicted herein (including method 300 in FIG. 3) may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Process 300 includes retrieving values for a performance metric for a software application, wherein each respective value is associated with a respective time period. Process 300 further includes identifying a regression based on a value for the performance metric that is beyond a predetermined threshold, and retrieving metadata associated with the time period for value associated with the regression. Process 300 further includes retrieving profile data prior to (320) and after (325) the time period associated with the regression, identifying a portion of the software application associated with the regression (330), and generating a report (335).

A computer system (e.g., implemented by system 16 illustrated in FIGS. 1A and 1B) may perform the operations of the processes described herein, including the process shown in FIG. 3. Computer system 16 may perform portions of such processes alone, or in conjunction with other systems (e.g., by exchanging electronic communications over network 14 with a user system 12 or other device). The process of FIG. 3 may also be performed in conjunction with the functional components shown in FIG. 2.

The following example proceeds with reference to the components in FIG. 2, though the steps of the process 300 may be performed by different functional components. In this example, a change point detector (CPD) 210 retrieves a plurality of values of one or more performance metrics for a software application from metrics source (MS) 205. The metrics may measure a variety of hardware and/or software characteristics associated with one or more software applications.

The CPD 210 applies a configured change point detection algorithm to identify a regression (310) based on a value from the monitored performance metric being beyond a predetermined threshold, or based on other criteria. In some embodiments, a stream of data provided from the MS 205 is constantly being analyzed (e.g., on a periodic basis). In some embodiments, the system may operate in conjunction with an anomaly detection algorithms/techniques in addition, or as an alternative, to threshold-based rule detection.

If the CPD 210 identifies a change event has occurred, it creates a change point event (CPE) that captures information regarding the change. The information may include, for example, the absolute change in the metric value, a percentage change of the metric value (e.g., represented in the same units as the corresponding metric stream), a change point timestamp, and other metadata that tied to the corresponding metric stream (e.g., host, pod, region, tenant, service, etc).

The CPE generated by the CPD 210 is published to the divergence analyzer (DA) 215. In response to the CPE, the DA 215 retrieves profiling data prior to (320) and subsequent to (325) the time period that is included in the CPE event. As described herein, the sample sets before and after the regression are referred to as data sets Pb and Pa, respectively. Embodiments of the present disclosure may capture data for the Pb and Pa sets for any suitable duration of time, and the time periods analyzed for Pb and Pa need not be identical.

In some embodiments, the profile data includes raw data samples such as the call path as well as contextual information (e.g., host information, tenant information, a thread identifier, a thread name, etc) associated with the thread of the software application at the time of capture.

The DA 215 identifies (330) a portion of the software application associated with the regression based on: the metadata, the profile data associated with the performance metric prior to the respective time period for the identified value (Pb), and the profile data associated with the performance metric subsequent to the respective time period for the identified value (Pa).

In some embodiments, the system may build aggregates for Pb and Pa based grouping on specified dimensions (e.g., path, host+ path, host+ thread+ path, host+ path, tenant, user, etc). The aggregated data set for Pb and Pa may be referred to herein as APb and APa (respectively) for the path, AHPb and AHPa (respectively) for host+ path, and so forth. During the aggregation, other scalar values available on the sample record may have an aggregated function applied to them to generate new derived metrics (e.g., p50 cpu time, count of samples, etc).

The system may join each pair of aggregates by the dimension. APb ⋈ APa for joining the aggregated by path before set with the aggregated by path after set. AHPa ⋈ AHPb for joining the aggregated by host and path before set with the aggregated by host and path after set. Generically, this may be indicated by AXa ⋈ AXb for joining the aggregated by X before set with the aggregated by X after set.

The system may apply the differential function to generate differential derived attributes per tuple (e.g., pairs of aggregates). The derived attributes represent the change between the aggregated function attribute (count of samples) in both absolute and relative difference.

The system may order the set based on a comparative function. For example, the set may be ordered based on an absolute difference, a relative difference or a composite of attributes. In some embodiments, the direction of the sorted values will be descending. The system may filter or reduce the set down to the top "k" values. For example, k may be computed based on the magnitude of the change that the CPE specifies or determined based on other criteria.

For each tuple remaining in the set (e.g., after filtering), the system may apply a code identification heuristic. Continuing the example using the components in FIG. 2, the code identification heuristic may use the code ownership service (COS) for owner identification for each tuple. The system also may assign a fingerprint or other unique identifier to each of the tuples.

At this point in the example, the set contains the top-k regressed code paths, along with corresponding owners. The DA 215 publishes the set of data to the regression report generator (RRG) 225. The RRG 225 iterates through the top k identified entries. For each tuple, an event will be sent to the issue tracking system (ITS) 230 to generate a record of the issue.

The ITS 230 first checks whether the issue associated with the received event is known (e.g., by looking up the issue by unique identifier/fingerprint). If the issue already exists in the ITS 230, then the occurrence count for the existing issue will be incremented, otherwise a new issue is created.

The RRG 225 will generate a report summary corresponding to the identified regression. The report may include a variety of information regarding the regression. In some embodiments, for example, the report may include links to an application performance management (APM) service (e.g., a service that surfaces application metrics and profiling) where development teams can see a detailed view of the difference in the values of the monitored metrics. In some embodiments, the report may include multiple comparative analysis views for each aggregation level, providing the dimension as well as metric data for the top-k entries.

In some embodiments, the system may determine a priority for the issue. The priority may be based on a variety of different criteria. In one embodiment, the priority of an issue is first based on the impact of the regression determined based on the proportionality of the regression compared to the change point magnitude (e.g., the magnitude of the difference between the measured metric at Pb and Pa). Secondly, the priority may be influenced by the frequency at which it occurs during a predetermined time period. For example, issues that have less impact per occurrence, but occur frequently, may substantially influence the priority of the issue.

Embodiments of the present disclosure help improve the functionality of existing software application performance regression systems. For example, the process depicted in FIG. 3 may be applied to both production and pre-production performance environments where application performance is constantly being evaluated. In both environments, the embodiments of the present disclosure help reduce the cost of ownership, and improve the identification of issues, thereby helping to improve software application quality more quickly and efficiently compared to conventional systems.

Some embodiments of the present disclosure may be integrated with continuous deployment (CD) systems (e.g., blue/green, canary, etc), used to validate if a release should be rolled back. Embodiments may operate in conjunction with any metric that can be retrieved and associated with corresponding source code. While the examples shown herein describe JVM applications, embodiments of the present disclosure are applicable to runtimes other than the JVM, and can be used on native binaries.

Consider another example whereby embodiments of the present disclosure are used for the automated detection and remediation of a memory regression. In this example, a release is applied to a service's canary instance, and the current memory allocation rate metric is being monitored by the CPD 210.

Figure 4:
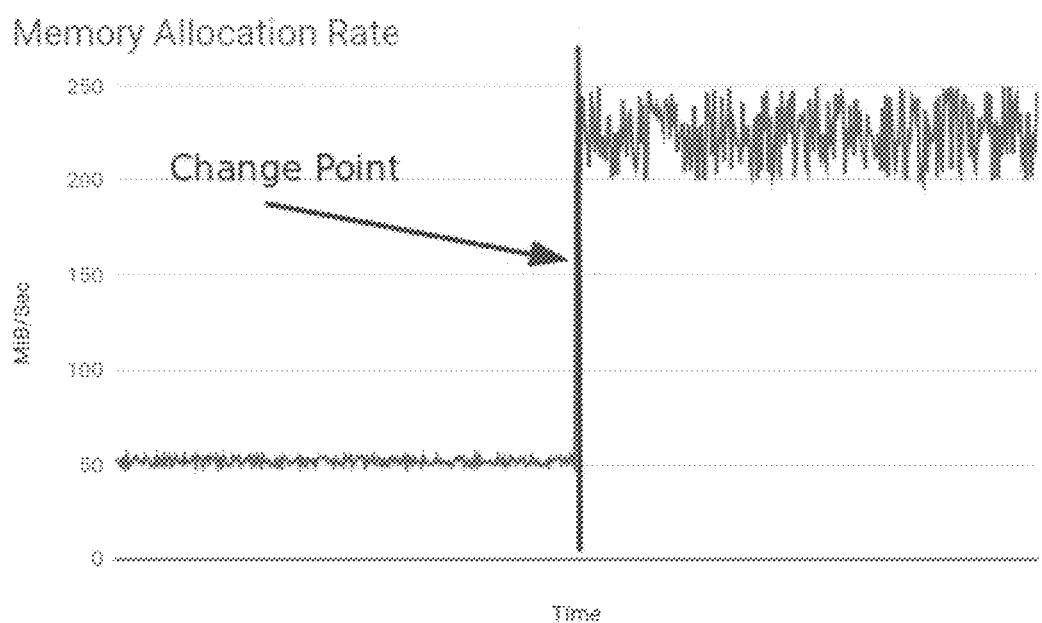
FIG. 4 is a graph illustrating the detection of a change in a performance metric according to various aspects of the present disclosure.

In this example, after some period of time after the release has gone out to the canary set of services, the CPD 210 detects that the memory allocation rate has changed. FIG. 4 is a graph illustrating the detection of a change in the memory allocation rate metric, showing the memory allocation of the application at around 50 MiB/sec prior to the change point when the value of the memory allocation metric spikes to about 200-250 MiB/sec.

The CPD 210 generates a CPE, triggering the DA 215 to perform a transient memory analysis. The DA 215 analyzes memory allocated (by thread) before and after the change point, joins on thread and computes the differential statistic, ordering the top threads by difference. Next, for each thread, a histogram of usage by class is gathered for the before and after period, joined by class type. Finally the top-k classes that dominate the memory usage are identified.

For this example, the following is a list showing memory allocated by thread X days before the change point in the format <thread name> <total accumulated GiB>:

| | |
|---|---|
| foo | 93,999 |
| bar | 65,221 |
| baz | 48,990 |
| bif | 1,763 |

Similarly, the following is a list showing memory allocated by thread X days after the change point in the format <thread name> <total accumulated GiB>:

| | |
|---|---:|
| foo | 3,999 |
| bar | 165,221 |
| baz | 948,990 |
| bif | 763 |

These before and after sets are joined to determine the difference between the two sets, sorted, and the top-k sets fetched (the top one in this example). The DA 215 will provide the top-k allocation call sites. The captured metadata will be published to the RRG 225, will generate a summary of the issue using a corresponding transient memory allocation spike template. The report for this example may include, for instance: "Thread: baz; GiB Abs Diff: 900,000; Class Rank: 1; Class: byte[ ]; Amount: 500,000; % of Thread: 56%; Path Rank: 1; Path: x→y→java.nl."

For each thread/class/call site that was identified as a problem, the corresponding owner will be identified by passing the path into the COS 220 which will return the owning team. The RRG 225 iterates through the identified thread/class/call sites/owner and raises an issue in the ITS 230. If there is an existing issue for the regression, then the occurrences count will be incremented, and the details will be added. The issue may be assigned to the corresponding owning team with an identified priority associated with the issue.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a processor; and
memory coupled to the processor and storing instructions that, when executed by the processor, cause the system to perform operations comprising:
retrieving a plurality of values of a performance metric for a software application, each respective value associated with a respective time period;
identifying a regression based on a value from the plurality of values that is beyond a predetermined threshold;
retrieving metadata associated with the respective time period for the identified value;
retrieving profile data associated with the performance metric prior to the respective time period for the identified value;
retrieving profile data associated with the performance metric subsequent to the respective time period for the identified value; and
identifying a portion of the software application associated with the regression based on: the metadata, the profile data associated with the performance metric prior to the respective time period for the identified value, and the profile data associated with the performance metric subsequent to the respective time period for the identified value, wherein identifying the portion of the software application associated with the regression includes building an aggregated data set based on the profile data associated with the performance metric prior to the respective time period and the profile data associated with the performance metric subsequent to the respective time period.

2. The system of claim 1, wherein the profile data associated with the performance metric includes a call path.

3. The system of claim 1, wherein the profile data associated with the performance metric includes contextual information associated with the software application.

4. The system of claim 3, wherein the contextual information includes one or more of: host information, tenant information, a thread identifier, and a thread name.

5. The system of claim 1, wherein building the aggregated data set includes joining pairs of aggregates from the profile data associated with the performance metric prior to the respective time period and the profile data associated with the performance metric subsequent to the respective time period.

6. The system of claim 5, wherein identifying the portion of the software application associated with the regression includes applying a differential function to the pairs of aggregates to generate differential derived attributes.

7. The system of claim 1, wherein building the aggregated data set includes ordering the aggregated data set based on a comparative function.

8. The system of claim 1, wherein building the aggregated data set includes filtering the aggregated data set based on a magnitude of change between the profile data associated with the performance metric prior to the respective time period and the profile data associated with the performance metric subsequent to the respective time period.

9. The system of claim 1, wherein building the aggregated data set includes assigning a unique identifier to each pair of aggregates.

10. The system of claim 1, wherein identifying the portion of the software application associated with the regression includes applying a code identification heuristic to each respective entry in the aggregated data set to identify an owner of code associated with the respective entry.

11. The system of claim 1, wherein the memory further stores instructions for causing the system to generate a report identifying the portion of the software application associated with the regression.

12. The system of claim 11, wherein generating the report includes incrementing an occurrence count for an existing issue in an issue tracking system.

13. The system of claim 11, wherein generating the report includes creating a new issue in an issue tracking system.

14. The system of claim 11, wherein the report identifies a thread associated with the regression, and a difference between the profile data associated with the performance metric prior to the respective time period and the profile data associated with the performance metric subsequent to the respective time period.

15. The system of claim 11, wherein generating the report includes determining a priority of the regression, and identifying the priority of the regression in the report.

16. The system of claim 15, wherein the priority of the regression is based on a magnitude of difference between the profile data associated with the performance metric prior to the respective time period and the profile data associated with the performance metric subsequent to the respective time period.

17. The system of claim 15, wherein the priority of the regression is based on a frequency at which the regression occurs during a predetermined time period.

18. A tangible, non-transitory computer-readable medium storing instructions that, when executed by a computer system, cause the computer system to perform operations comprising:
retrieving a plurality of values of a performance metric for a software application, each respective value associated with a respective time period;
identifying a regression based on a value from the plurality of values that is beyond a predetermined threshold;
retrieving metadata associated with the respective time period for the identified value;
retrieving profile data associated with the performance metric prior to the respective time period for the identified value;
retrieving profile data associated with the performance metric subsequent to the respective time period for the identified value; and
identifying a portion of the software application associated with the regression based on: the metadata, the profile data associated with the performance metric prior to the respective time period for the identified value, and the profile data associated with the performance metric subsequent to the respective time period for the identified value, wherein identifying the portion of the software application associated with the regression includes building an aggregated data set based on the profile data associated with the performance metric prior to the respective time period and the profile data associated with the performance metric subsequent to the respective time period.

19. A method comprising:
retrieving, by a computer system, a plurality of values of a performance metric for a software application, each respective value associated with a respective time period;
identifying, by the computer system, a regression based on a value from the plurality of values that is beyond a predetermined threshold;
retrieving, by the computer system, metadata associated with the respective time period for the identified value;
retrieving, by the computer system, profile data associated with the performance metric prior to the respective time period for the identified value;
retrieving, by the computer system, profile data associated with the performance metric subsequent to the respective time period for the identified value; and
identifying, by the computer system, a portion of the software application associated with the regression based on: the metadata, the profile data associated with the performance metric prior to the respective time period for the identified value, and the profile data associated with the performance metric subsequent to the respective time period for the identified value, wherein identifying the portion of the software application associated with the regression includes building an aggregated data set based on the profile data associated with the performance metric prior to the respective time period and the profile data associated with the performance metric subsequent to the respective time period.

* * * * *